US008402023B2

(12) United States Patent
Sheehan et al.

(10) Patent No.: US 8,402,023 B2
(45) Date of Patent: Mar. 19, 2013

(54) SYSTEMS AND METHODS FOR RANKING USER DEFINED TARGETS IN A UNIVERSAL GRAPH DATABASE

(75) Inventors: Timothy Patrick Sheehan, Decatur, GA (US); Christian Michael Bates, Wanship, UT (US); Paul Samuel Stevens, Jr., Salt Lake City, UT (US); Richard Stafford, Bountiful, UT (US)

(73) Assignee: Reachable, Inc., Palo Alto, CA (US)

( * ) Notice: Subject to any disclaimer, the term of this patent is extended or adjusted under 35 U.S.C. 154(b) by 0 days.

(21) Appl. No.: 12/907,822

(22) Filed: Oct. 19, 2010

(65) Prior Publication Data
US 2012/0095998 A1    Apr. 19, 2012

(51) Int. Cl.
*G06F 17/30*    (2006.01)

(52) U.S. Cl. ........................................... 707/728

(58) Field of Classification Search .................. 707/1, 3, 707/728; 709/223
See application file for complete search history.

(56) References Cited

U.S. PATENT DOCUMENTS

| 2003/0187813 | A1* | 10/2003 | Goldman et al. ................. 707/1 |
| 2004/0122803 | A1 | 6/2004 | Dom et al. |
| 2010/0161369 | A1 | 6/2010 | Farrell et al. |
| 2012/0096002 | A1 | 4/2012 | Sheehan |

* cited by examiner

Primary Examiner — Etienne Leroux
(74) Attorney, Agent, or Firm — Hickman Palermo Truong Becker Bingham Wong LLP

(57) ABSTRACT

A computer-implemented method for determining a connection ranking value between entities includes receiving private information from a user, and retrieving public information from publicly available sources. The method also includes matching the public information with the private information, generating a graph database with the public and private information, establishing at least one search criteria, and generating a connection ranking value between entities in the graph database based on the search criteria.

14 Claims, 9 Drawing Sheets

SYSTEMS AND METHODS FOR RANKING USER DEFINED TARGETS IN A UNIVERSAL GRAPH DATABASE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve the ability to communicate with other users of computer technologies. For example, social networking websites allow users to communicate with each other. A user of these sites may establish "contacts" which may be family, friends, co-workers, acquaintances, friends of friends, etc. of the user. In addition, address book features of certain applications (such as email applications) allow a user to store contact information for family, friends, co-workers, etc. The user may access his/her address book to obtain contact information for an individual when he/she desires to contact that particular individual.

The increased ease of gathering information about people, places, activities, histories, and preferences has resulted in users creating large collections of information about the people they are connected to and the ways they are connected. The volume and organization of the information often leads to ineffective use of the information.

SUMMARY

An example computer-implemented method for determining a connection ranking value between entities includes receiving private information from a user, and retrieving public information from publicly available sources. The method also includes matching the public information with the private information, generating a graph database with the public and private information, establishing at least one search criteria, and generating a connection ranking value between entities in the graph database based on the search criteria.

The private information may include relationship information between the user and at least some of the entities. The method may further include continuously retrieving the public information and automatically updating the connection ranking value. The method may include creating a pathway between the entities based on the at least one search criteria, wherein the connection ranking value is based at least in part on the pathway. The method may include displaying the connection pathway and connection ranking value. The method may include receiving private information about the user and other private information such as relationships between the user and the plurality of contacts.

Another example relates to a computer system configured to determine a connection ranking value between entities. The computer system includes a processor, memory in electronic communication with the processor, and a ranking module. The ranking module may receive private information from a user, retrieve public information from publicly available sources, match the public information with the private information, generate a graph database with the public and private information, establish at least one search criteria, and generate a ranking value between entities in the graph database based on the search criteria.

The ranking module may further be configured to continuously retrieve the public information and automatically update the ranking values. The ranking module may be configured to create a pathway between the entities based on the at least one search criteria. The ranking value may represent aspects of the pathway. The ranking value may be based at least in part on relationship information between the user and at least one of the entities.

A further example relates to a computer-program product for determining connections between entities. The computer-program product comprises a computer-readable medium having instructions thereon. The instructions may include code programmed to receive private information from a user, code programmed to retrieve public information from publicly available sources, code programmed to match the public information with the private information, code programmed to generate a graph database with the public and private information; code programmed to establish at least one search criteria, and code programmed to generate a ranking value between entities in the graph database based on the search criteria.

The instructions may further include code programmed to create a pathway based on the search criteria. The instructions may further include displaying the ranking value and the pathway.

Another example relates to a computer-implemented method for generating a ranking value for a user-defined target. The method includes establishing at least one search criteria for a user-defined target, retrieving public information relating to the search criteria from publicly available sources, creating at least one pathway to the user-defined target that meets the search criteria, generating a ranking value for the at least one pathway, and displaying the ranking value.

The method may also include displaying the at least one pathway. The method may include continuously retrieving the public information and automatically updating the ranking value. The at least one pathway may include a plurality of pathways, wherein the ranking value is based on at least one of a strength of each of the plurality of pathways, a total number of pathways, and a length of the pathways.

The method may include receiving personal information from at least one user, and matching the personal information with the public information.

A further example relates to a computer system configured to generate a ranking value for a user-defined target. The computer system includes a processor, memory in electronic communication with the processor, and a rank generating module. The rank generating module may be configured to establish at least one search criteria for a user-defined target, retrieve public information related to the search criteria from publicly available sources, create at least one pathway to the user-defined target that meets the search criteria, generate a ranking value for the at least one pathway, and display the ranking value.

The rank generating module may be configured to display the at least one pathway. The rank generating module may be configured to store the pathways and ranking values. The rank generating module may be further configured to continuously retrieve the public information and automatically update the at least one pathway and the ranking value. The at least one pathway may include a plurality of pathways, wherein the ranking value is based on at least one of a strength of each of the plurality of pathways, a total number of pathways, and a length of the pathways.

Another example relates to a computer-program product for generating a ranking value for a user-defined target. The computer-program product includes a computer-readable medium having instructions thereon. The instructions include code programmed to establish at least one search criteria for a user-defined target, code programmed to retrieve public information relating to the search criteria from publicly available sources, code programmed to create at least one pathway to the user-defined target that meets the search criteria, code programmed to generate a ranking value for the at least one pathway, and code programmed to display the ranking value.

The instructions may further include code programmed to display the at least one pathway. The instructions may further include code programmed to receive personal information from at least one user, and the at least one pathway created using the public and private information. The at least one pathway may include a plurality of pathways, wherein the ranking value is based on at least one of a strength of each of the plurality of pathways, a total number of pathways, and a length of the pathways.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
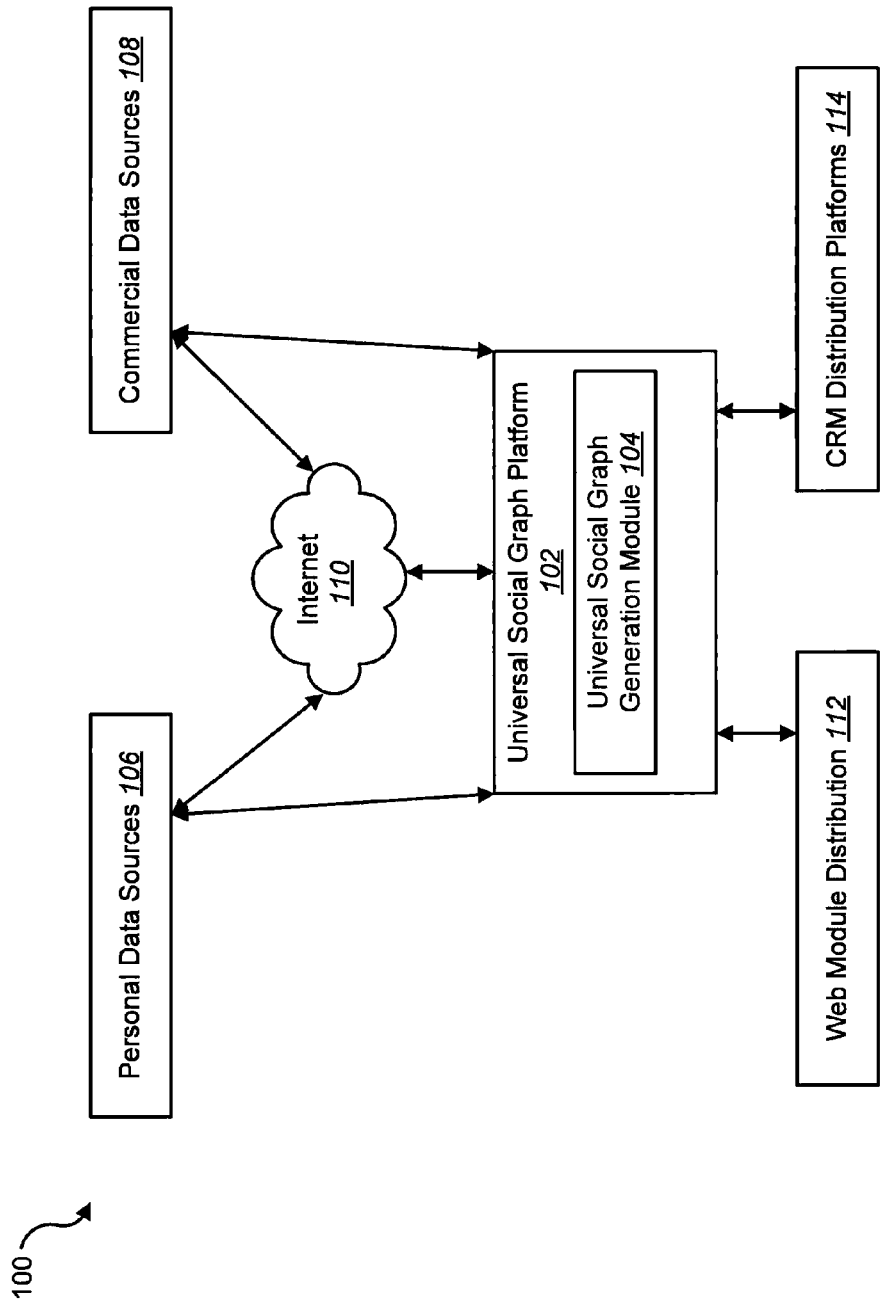
FIG. 1 is a block diagram illustrating one embodiment of universal social graph platform communicating with various data sources and distribution modules to implement the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Online social network portals have gained popularity in recent years. Users of these networks may be members of multiple online social network portals. Examples of these portals may include LinkedIn®, XING®, Viadeo®, and FaceBook®. Each user of these various network portals may create and maintain a list of contacts. A user's list of contacts for a particular network portal may include family members, friends, co-workers, acquaintances, classmates, friends of friends, etc. that are also members of that particular network portal. For example, a member of the social network LinkedIn® may create a list of contacts that includes family members, friends, co-workers, acquaintances, classmates, friends of friends, etc. that are also members of LinkedIn®.

Social network portal users may also create and maintain a list of contacts in their personal offline networks. Examples of offline networks may include Outlook®, Lotus Notes®, Yahoo®, or any other relationship management system. These lists of contacts are commonly placed in an electronic address book associated with each relationship management system.

The total number of contacts across various social networks and offline networks has increased dramatically. A given user may have hundreds or even thousands of contacts, many of which are duplicated across the different social networks and offline networks. It is often difficult for users to keep track of the relevance of a given contact, the user's connection to the contact, and current information (e.g., address, phone, employer, job title, personal and professional events, etc.) for each contact.

The present disclosure provides a system that tracks public and private connections between people and provides connection and profile information as a software platform via the Internet and at least one application programming interface (API). The system may implement or generate at least one graph database. The graph database may be updated in real time. The system may be capable of being used on a large scale to power cloud or software as a service based application that services simultaneous users and run simultaneous algorithms. An example system implementing a graph database is described in U.S. application Ser. No. 12/907,164, entitled A DATA GRAPH CLOUD SYSTEM AND METHOD and filed on Oct. 19, 2010, which is incorporated herein in its entirety by this reference.

FIG. 1 is a block diagram illustrating one embodiment of a system 100 in which a universal social graph platform 102 communicates with a personal data source 106 and a commercial data source 108 to implement the present systems and methods. The universal social graph platform 102 may also communicate with web module distribution 112 and CRM (customer relationship management) distribution platforms 114. The universal social graph platform 102 may communicate via the Internet 110 or other communication mediums. The universal social graph platform 102 may include a universal social graph generating module 104.

The universal social graph generating module 104 may use private information from the personal data sources 106 and public information, such as information from the commercial data sources 108, to create at least one universal social graph database. The universal social graph generating module 104 may use software systems to create graph databases. The universal social graph generating module 104 may track publicly available information on people and other entities. The term "entities" in this context may be defined to include, for example, people, companies, government agency, education institutions, education degrees, job positions, interests, hobbies, and geographic locations. The term "entity" or "entities" may be inclusive of individuals, groups of individuals, organizations, attributes, hobbies, activities, or other types of information that can be collected and connected. An entity may include private information submitted by a user, such as information about the user (e.g., work history, education history, interests, personal attributes, and geographical location) and information about the user's contacts.

In one example, the universal social graph generating module 104 focuses primarily on information that connects people, including, for example, location, hobbies and employment history. However, in other examples, the information collected can be used to create connections in other ways such as between two inanimate entities such as two companies. While the examples that follow herein focus primarily on a user's contacts and other private information as the entity for which connections are determined, other types of entities may be used.

The universal social graph generating module 104 may identify and normalize information and establish connections between entities based on this information. The public information available from the commercial data sources 108 and other publicly available sources is typically constantly changing and being updated from, for example, targeted data source updates and real-time and on-the-go Internet queries.

Individuals and enterprises may upload private information from the personal data sources 106 into the universal social graph generating module 104. The universal social graph generating module 104 may be operable to disambiguate and normalize the information about people and match that information with publicly available information about people. Ownership of each item of information may be maintained as public or private based on the source of that information. Private ownership may be qualified by an individual contributor. The public information may be gathered from public sources, such as the commercial data sources 108 and be ingested into a graph database using algorithms that allow the universal social graph generating module 104 to compute strength of connectivity between individuals.

The strength of connectivity may be reported as a quantifiable computed or determined value. This quantifiable computed value may be used as a search algorithm as part of the search criteria. This quantifiable computed value may also be used in a graph traversal for the strength of a connection. The quantifiable computed value may be generated using the connection value generating module 320. The strength of connectivity may be represented in other ways besides a quantifiable value. For example, the strength of connectivity may be represented with a color code, a symbol, audible tone, or a chronological presentation, or any combination thereof.

The output from the universal social graph generating module 104 may be a constructed network of entities and their private and public connections. The output may be in the form of a graph database. This constructed network may be possible without each person in the system having opted into the network and intentionally contributed their public information. Contributions of private information are typically authorized by each user who accesses the graph database. The private information may include as little as a person's name, such as the user's name. The output is typically made available for users to search, append, and use to find information on and connections to other people via, for example, the web module distribution 112 and CRM distribution platform 114.

Typically, the universal social graph generating module 104 communicates with the personal data sources 106, commercial data sources 108, web module distributions 112 and CRM distribution platform 114 via the Internet 110. In some arrangements, any one of the personal data sources 106, commercial data sources 108, web module distribution 112 and CRM distribution platforms 114 may be directly connected to the universal social graph platform 102 and/or the universal social graph generating module 104 rather than a connection via the Internet 110.

The universal social graph database created by the universal social graph generating module 104 is a connected network of people and entities that connect them. The universal social graph database may contain billions of people in associated relationships. A full detail of the connections between people may be maintained in a graph database maintained on the universal social graph generating module 104. Data may be added to the graph database in real time. Typically, real time searches to find people and connections between people are available on the graph database using the universal social graph generating module 104.

The public information available to the universal social graph generating module 104 may be provided, at least in part, through the commercial data sources 108 and information available on the Internet 110 and other publicly available sources. The public information may be organized as a public graph database that includes information about people and entities that connect them. The public graph database typically contains all information that can be gathered from public data sources. The public graph database is typically an open network that does not require user contribution. The public graph database usually includes entity disambiguation across multiple data sources. In order to provide a true connected system, nodes in the public graph database are uniquely identified across all publicly available input data sources. This construction allows for connectivity of entities and people in a way that allows traversal without running into duplication.

In a public graph database, people or other entities are stored as nodes in the graph with connections to associated entities. People are connected to each other through the associated entities. Any user of the system 100 is typically allowed to view and traverse relationships made available through publicly available data or information.

The information available through the personal data sources 106 may be constructed as a private graph database. This information and connections between people available from the personal data sources 106 may be formed as a result of the privately contributed information. This privately contributed information is available to the user and anyone the user has selected to share their private/personal information. The universal social graph platform 102 and associated universal social graph generating module 104 may maintain information on many different private graph databases and their connection points into the public graph database. Private graph databases may be merged into or separated from other private graph databases based on user access rights (e.g., user rights maintained on arcs between nodes in the graph databases).

The private graph databases may include software system integrations with other systems that store individual enterprise information about people and contacts that allow for automatic uploading and syncing of private information on people. The private graph databases may include private information that is meshed with the public graph database information. The nodes are identified as the same between the public and private graph databases to permit a connection from nodes in the private graph database to the public graph database.

In some examples, the public and private information is collected into a single master graph database. In other examples, separate public and private graph databases are constructed for each of the public information and the private information.

Private networks in which permissions are extended between different private graph databases may be shared within groups of users. Private connections may be made and can be traversed in the private graph databases by users with private access to the information that created the connection in the private graph database. Private access may be obtained by ownership or by granting through sharing rights.

The universal social graph generating module 104 tracks individual ownership of information that connects people. The universal social graph generating module 104 provides an option for users to share their private information with other users. Sharing of private information opens up the relationships owned by the user to others who are sharing in this group or globally sharing. Users may also opt to make private information public so that the private information becomes part of the public graph database.

One aspect of the system 100 is that the information collected by the universal social graph generating module 104 is comprehensive and current. The graph database maintained by the universal social graph generating module 104 is preferably kept up to date with the personal data sources 106 and commercial data sources 108 and other information available publicly. One way to improve the collection of current and up-to-date information is to provide recurring data source updates. Public data may be continuously updated through an automated process. Searches for people in the system may trigger Internet searches to retrieve targeted profiles and infer people and relationships from targeted search results using any available search engine. The Internet may be constantly monitored for more information on existing public and private people and/or information in the system 100 and also identify new public people and/or information to add to the system 100.

Updates to public information may affect many aspects of the system 100. For example, any nodes in a private graph database may be updated with changed public information. Private data may also be continuously updated as the personal data sources 106 may be continuously synchronized with the universal social graph generating module 104.

The universal social graph generating module 104 may also provide profiles and connection paths between entities (e.g., connections between people). These profiles may contain searching and analytics. The searching may include looking up people in a variety of attributes, such as their location or places they have worked. The analytics may include real time path finding to show how anyone in the universal social graph database, whether private or public, is connected. The analytics may use a dynamic model to enable applying user preferences to the search and user criteria for finding the strongest connections.

Information in the universal social graph database may be maintained as connections between entities. The connection information may be presented visually to the user via any desired format including, for example, the web module distribution 112 and CRM distribution platforms 114. The universal social graph generating module 104 may present information as, for example, an XML, text description or other format that may be optimized for certain users and applications. The visual presentation of the information provided by the universal social graph generating module 104 may include, for example, different node sizes, colors, shapes, screen locations, and node descriptions. Relationships and arcs between nodes may have different, for example, sizes, shapes, colors, and descriptions that improve the visual presentation.

The universal social graph generating module 104 may capture all relationships with associated levels of privacy. Typically, every user accessing the universal social graph database may see and traverse all publicly available data. Users may also see and traverse information they own or information owned by someone that has been given permission to share.

Figure 2:
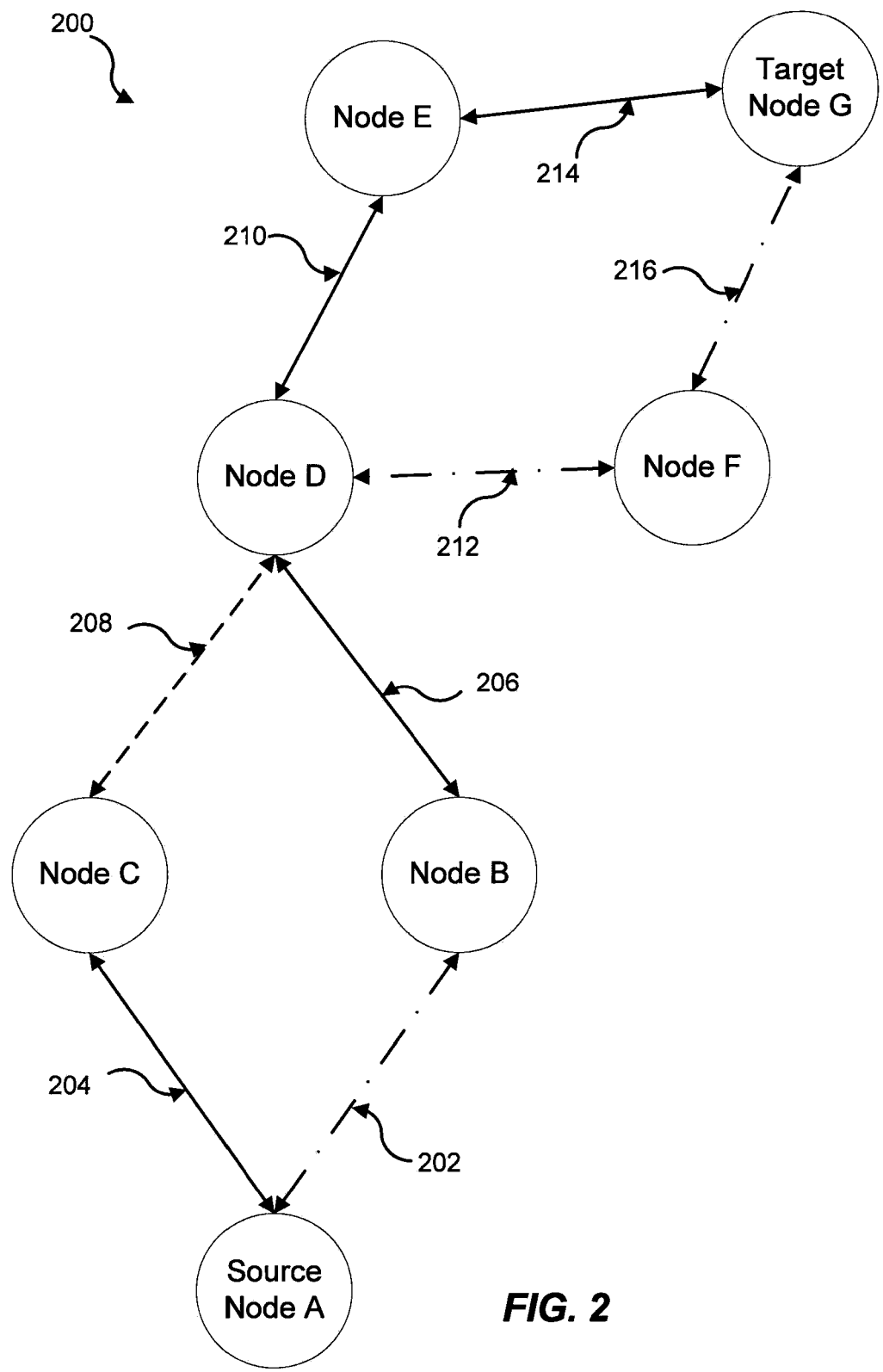
FIG. 2 is a node diagram illustrating example pathways to a target using the universal social graph platform of FIG. 1.

Referring to FIG. 2, an example connection pathway web 200 provides a visual representation of an output from the universal social graph generating module 104 includes a plurality of nodes and connecting arcs. The nodes are labeled Node A-G. The plurality of connecting arcs 202, 204, 206, 208, 210, 212, 214, 216 connect the Nodes A-G to provide a connection path between a source Node A and a target Node G. The solid line connecting arcs 204, 206, 210, 214 represent public relationships between nodes, meaning any user can see and traverse those arcs. The broken lines of connecting arcs 202, 212, 216 represent private relationships contributed by User 1. The broken line of connecting arc 208 represents a private relationship contributed by User 2.

If User 1 runs a search for target G, the user will see two pieces of information on Node G because the relationship from Node G to Node E is public, the relationship from Node G to Node F is contributed to User 1 (so can be seen). If User 2 or a User 3 views Node G, they will only see the relationship to Node E. If User 1 then runs a path from Node A to Node G, two paths exist. A first path traverses connecting arcs 202, 206, 210, 214, and a second path traverses connecting arcs 202, 206, 212, 216. If User 2 runs a path from Node A to Node G, User 2 would see one path along connecting arcs 204, 208, 210, 214. User 2 does not see the relationship between Node A and Node B or between Node D and Node F, and therefore cannot follow those paths. If a User 3 runs a path from Node A to Node G, there are no results.

Figure 5:
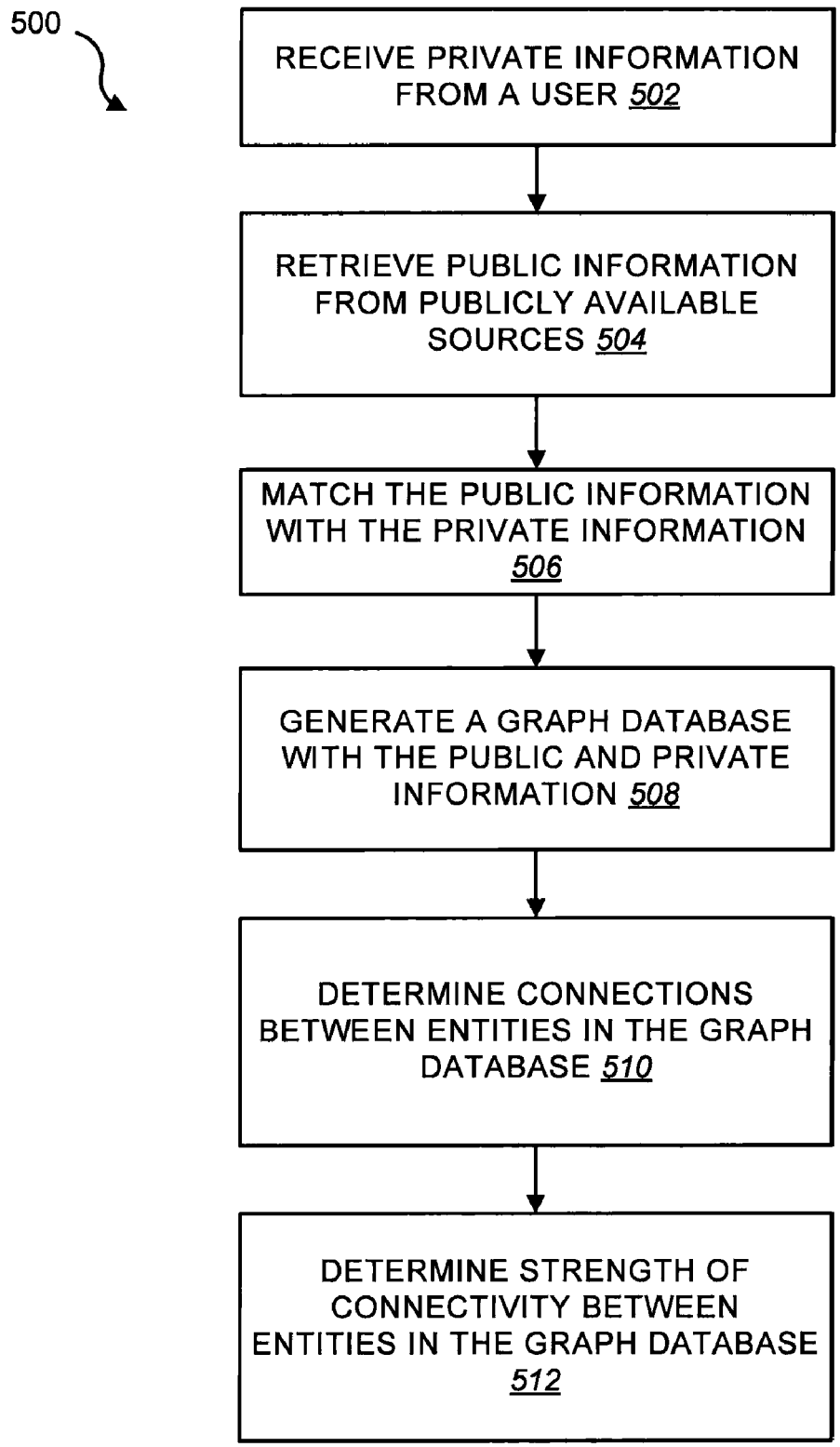
FIG. 5 is a flow diagram illustrating one embodiment of a method for generating a universal social graph database according to the block diagram of FIG. 1.

Referring now to FIG. 5, an example method utilizing the system 100 of FIG. 1 is shown and described. Method 500 includes a first operational step of receiving private information from a user. In a further operational step 504, the method includes retrieving public information from publicly available sources. In a following operational step 506, the method includes generating a graph database with the public information. The method includes matching the public information with the private information in a further operational step 508. In operational step 510, the method includes determining connections between entities in the graph database. The method includes determining strength of connectivity between the entities in the graph database in an operational step 512. Additional steps may be added to the method 500, or removed from the method 500 in various applications.

Figure 3:
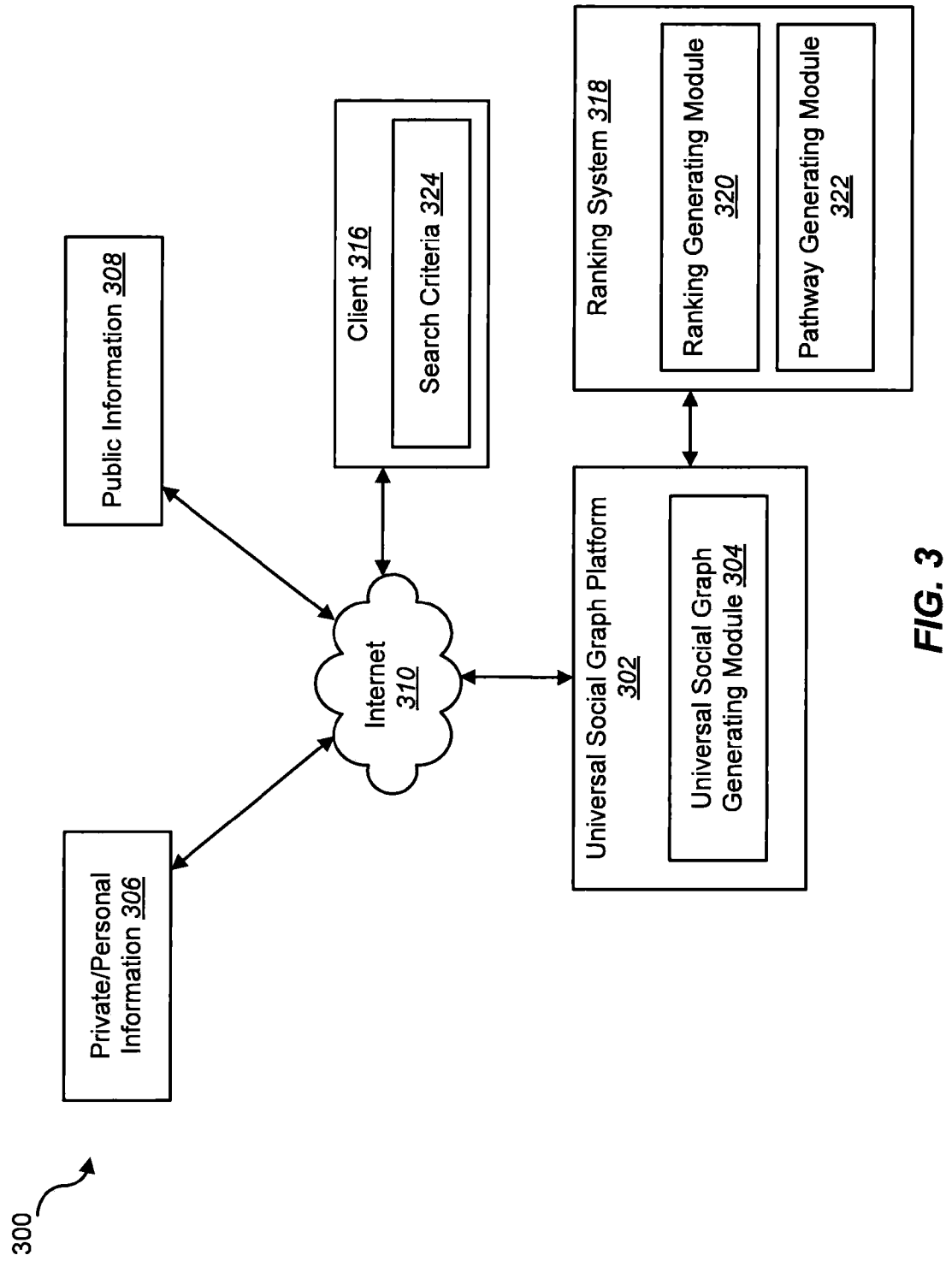
FIG. 3 is a block diagram illustrating one embodiment of a universal social graph platform operating with a ranking system.

Referring now to FIG. 3, aspects of the system 100, including the universal social graph generating module 104 discussed above with reference to FIGS. 1 and 2, may be included in another example system 300. The system 300 includes a universal social graph platform 302 having a universal social graph generating module 304. The universal social graph platform 302 and universal social graph generating module 304 may have the same or similar functions and features as discussed above related to system 100.

The system 300 may also include private/personal information 306 and public information 308 that are communicated to the universal social graph platform 302 via, for example, the Internet 310. The private/personal information 306 and public information 308 may be communicated directly to the universal social graph platform 302 through other communication channels such as described above for system 100.

The system 300 may also include a client 316 in communication with universal social graph platform 302. The client 316 may be, for example, a personal computer (PC), a laptop, a personal digital assistant (PDA), a smart phone, or any other type of computing or communication device.

The client 316 may include a search criteria module 324. The search criteria module 324 may provide a means for communicating certain search criteria, filtering requests, or targets for searches. In some arrangements, the search criteria module may operate independently of the client 316 (e.g., see the search criteria module 424 of the system 400 described below). The client 316 may communicate via the Internet 310, or directly with any other element of the system 300.

The system 300 may further include a ranking system 318 that includes a ranking generating module 320 and a pathway generating module 322. The ranking system 318 may be part of the universal social graph platform 302. In other arrangements, the ranking system 318 may be configured separately from the universal social graph platform 302. The ranking system 318 may communicate with the universal social graph platform 302 via the Internet 310 or directly through other communication methods or systems.

The ranking generating module 320 may operate to generate a ranking value such as a connection ranking value for any one of a plurality of contacts received by the universal social graph platform 302. The ranking value may be a numerical value representative of how any one of the plurality of contacts meets certain search criteria or a user-defined target.

The pathway generating module 322 may be used to generate a pathway between a user and certain of the plurality of contacts or targets that meet given search criteria or user-defined targets. Typically, a length of the pathway, a strength of the pathway, or the number of pathways between the user and any one or a plurality of the contacts may be used by the ranking generating module 320 to determine the ranking value.

The ranking value generated by the ranking generating module 320 and any of the pathways generated by the pathway generating module 322 may be displayed for viewing. The client 316 may obtain access to the ranking value and pathways via, for example, a web module distribution 112, or a CRM distribution platform 114 described above with reference to system 100. In one example, a ranking value for each of the plurality of contacts that meet the search criteria are displayed in a chart form. A user with access to the ranking values may obtain a visual presentation of the pathways associated with each of the ranking values by, for example, selecting the ranking value.

Figure 6:
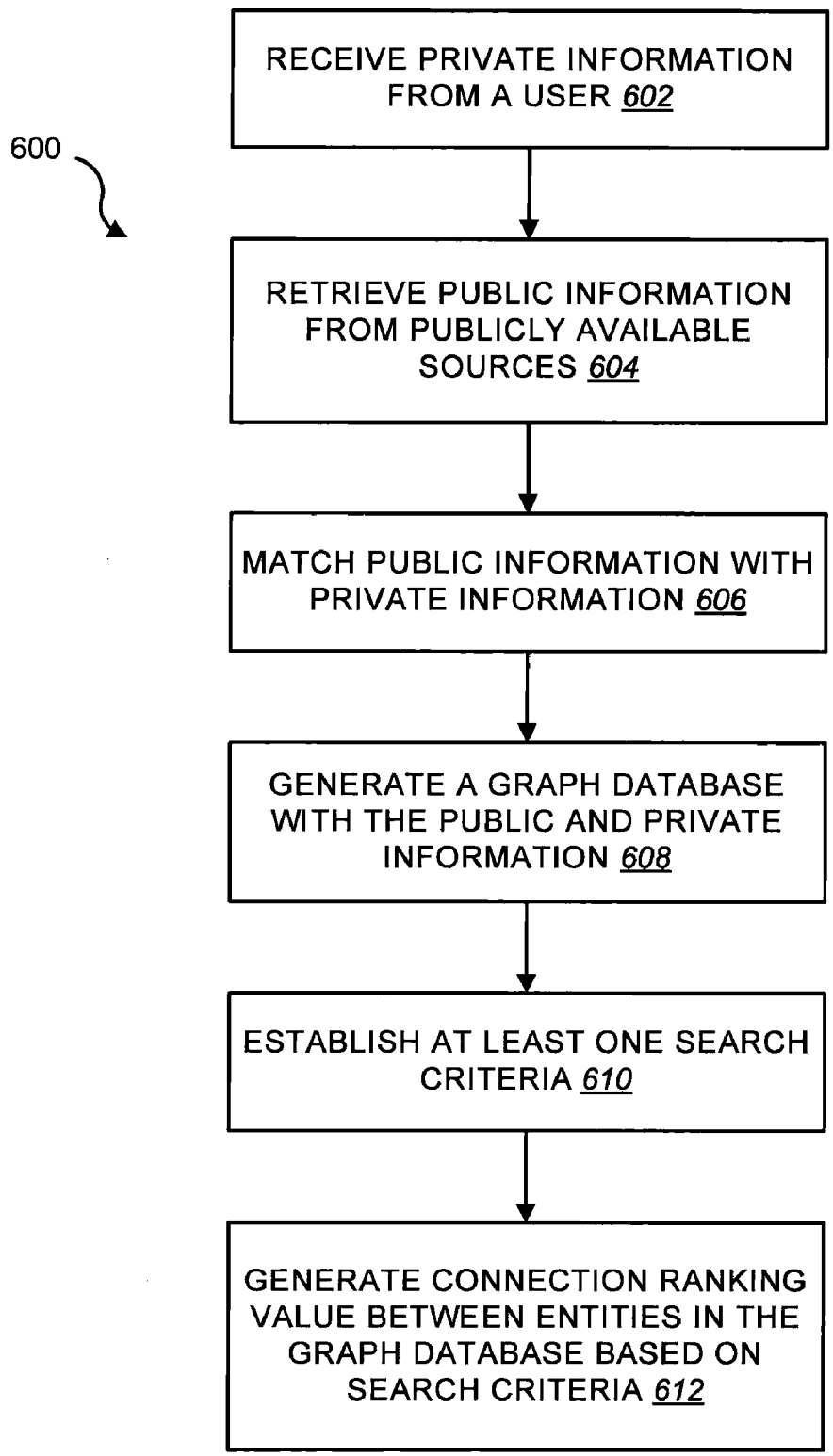
FIG. 6 is a flow diagram illustrating one embodiment of a method for determining a connection ranking value for a plurality of contacts according to the block diagram of FIG. 3.

Referring now to FIG. 6, an example method implementing the system 300 is shown and described. The method 600 may include a first operational step of receiving private information from a user. The method includes matching publicly available information with the private information in a step 604. In a step 606, the method includes matching public information with private information. In a step 608, the method includes generating a graph database with the public and private information. The method includes establishing at least one search criteria in a step 610, and generating connection ranking values for at least some of the plurality of contacts based on search criteria in a step 612.

Figure 4:
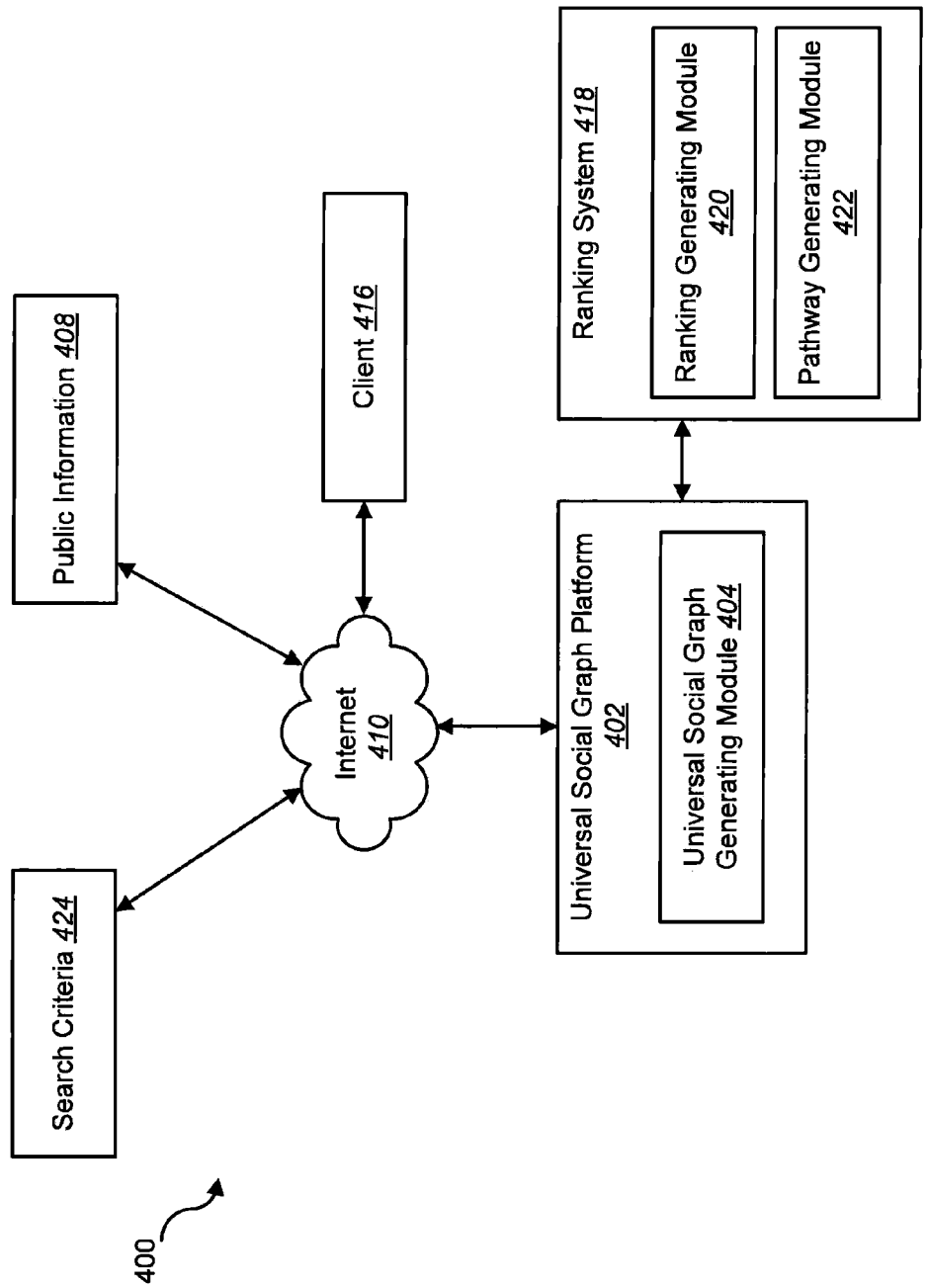
FIG. 4 is a block diagram illustrating another embodiment of a universal social graph platform operating with a ranking system.

Referring now to FIG. 4, another example system 400 is shown including a universal social graph platform 402 having a universal social graph generating module 404, a search criteria module 424, public information 408, a client 416, and a ranking system 418. The Internet 410 may be used to facilitate communication between the universal social graph generating module 404 and other features of system 400.

The ranking system 418 may include a ranking generating module 420 and a pathway generating module 422. In system 400, the search criteria module 424 may be an independently operable module from the client 416. In some arrangements, the client 416 may be used to submit private or personal information to the universal social graph platform 402 via, for example, the Internet 410. A universal social graph database generated by the universal social graph generating module 404 may receive or retrieve public information and additional information available from other sources. The universal social graph database may include other information such as, for example, private information received from the client 416. The private and public information may be matched within the universal social graph database using the universal social graph generating module 404.

The pathway generating module 422 may be used to create a pathway to certain targets based on search criteria submitted from the search criteria module 424. The ranking generating module 420 may generate a ranking value for at least one of the pathways. The ranking value and the pathways may be displayed for viewing.

The system 400 may have various applications outside of applications to contacts and how people meet certain search criteria. For example, the system 400 may be applicable to travel-related applications such as, for example, searching for airline flights that meet search criteria (e.g., flights on a certain day within a certain time range with a minimum number of connecting flights, that don't go through a particular city and have delays no more than X hours). Each of the search criteria may be ranked with a priority value which is taken into consideration when creating a ranking value. The ranking value may also depend at least in part on whether or not certain of the search criteria are met. In some examples, not all search criteria is met and the ranking value may be placed at 0, wherein in other examples meeting each one of the search criteria increases the ranking value above 0.

In another example application, the search criteria relate to vacation destinations that meet certain criteria such as, for example, average winter temperature, proximity to beaches, average cost of housing, local tax rate, etc. Other applications include telecommunications connections, prospect identification in a sales context, recruit identification in a recruiting context, portfolio and/or investment opportunities in an investing context, job identification in a job search context, professional services searching, dating services, and genealogy searching.

Figure 7:
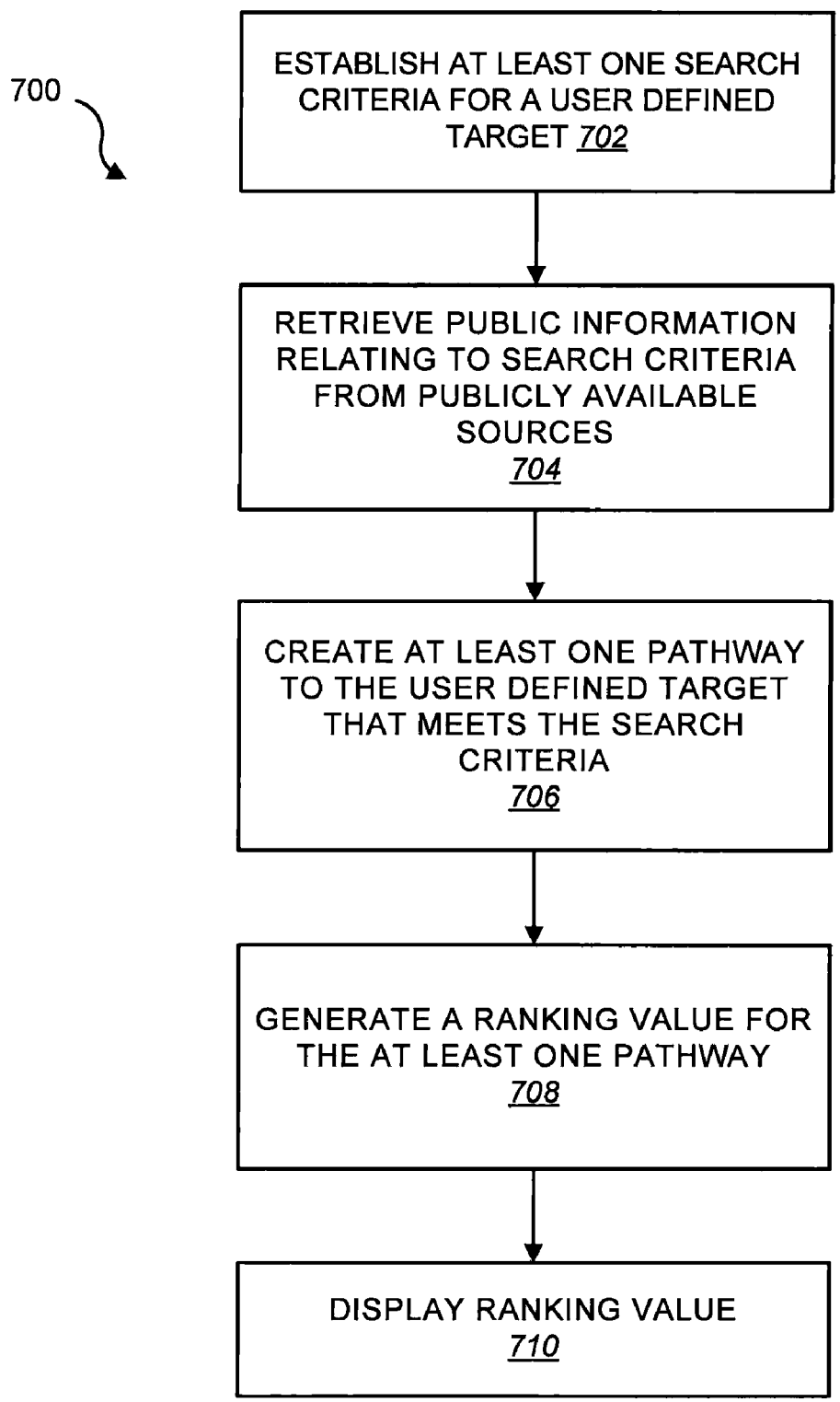
FIG. 7 is a flow diagram illustrating one embodiment of a method for generating a ranking value for a user defined target according to the block diagram of FIG. 4.

Referring to FIG. 7, example method 700 implementing the system 400 of FIG. 4 includes establishing at least one search criteria for a user to find a target in a first operational step 702. In a further step 704, the method includes retrieving public information relating to the search criteria from publicly available sources. In an operational step 706, the method includes creating at least one pathway to the user defined target that meets the search criteria. The method includes generating a ranking value for the at least one pathway in a step 708, and displaying the ranking value in a step 710.

The systems 300, 400 may implement an automated prioritization system for a user or a group of users based on connectivity to a particular item of interest. The group or individual may define targets or entities of interest. The group may also specify filter and search conditions permitted in finding connectivity. These targets may be automatically prioritized by computing a value of the target based on network connectivity to the target.

The processes implemented by the systems 300, 400 may involve a user interacting with the system by uploading information about themselves. This information may include user preferences and, if applicable, include information about direct relationships. In the case where targets are people (such as the system 300), the system may allow uploading personal connections from social networks and contact management systems, customers they have worked with, hobbies, groups, and any relationship information. This information may then be used to connect the user or group of users to the targets. Users may also be allowed to upload preferences about the connectivity or target. The user preferences may eliminate a number of targets when the target description is generic. For a system connecting people, a generic description of a target may include, for example, anyone in a particular zip code with a given current job title.

Users may specify criteria to eliminate possible connections. One example includes not connecting through any person who worked at a particular company, or not traveling through a certain airport to get to a destination. All user-specific information may be considered when finding a connectivity score or ranking value from the user to the target or just to the target. The resulting connection paths may be summarized into a score or value. This score or value may be computed based on, for example, the strength of multiple paths to the target, the number of paths to the target, and the varying length of paths to the target.

The systems 300, 400 may use not only direct connections to a target, but also assess multiple degree paths to the target. For a system connecting people, this may include a personal contact or friend on a social network who is on the board of directors for a particular company, which company employs an employee who used to work at the same company as the target.

The systems 300, 400 may be primed with information related to the target's domain. This information for the domain is usually linked in a data system so that it can be traversed. A user's target request may be uploaded and stored by the systems 300, 400. A user's search preferences may be registered globally and for each search. Tasks may be created for each requested target. A cloud distributed graph database created by the universal social graph generating modules 304, 404 may pull the targets and run an algorithm to compute the connection strength or ranking value for each value. The resulting connection score or ranking value and associated path may be stored for retrieval and visualization. As discussed above, the systems 300, 400 may be operable using the Internet or as an API. The system may be able integrate into domain-specific applications. In a case where the entity target is people, integrations may be made to email clients, browsers, messaging systems, and contact management systems.

Another example application of the systems 300, 400 is with a sales person and his/her sales prospects. The system may permit the system user to receive an automated ranking value for each sales prospect based on the user's connectivity to each sales prospect. This connectivity is computed by the system 300, 400 based on relationship information (e.g., work history, interests, schools/education) connecting directly to the prospect, or connecting to other people who connect to the prospect. Based on the strength and length of multiple paths found, an overall score or ranking value may be assigned to each prospect. Integration of the systems 300, 400 through APIs permits the scores to be retrieved by the integrating system. The integration may also permit visualization of each score to be retrieved and shown upon request.

Each score may be explained in greater detail by requesting the connection paths used to create the score or ranking. The system may return both a text description of the paths and a visualization of the connection paths or pathways. A collection of connection pathways may be summarized into a score based on the individual strength of each connection within a single path, the lengths of the path, the number of paths returned that meet the user's criteria, and other path characteristics. This visual display may be embedded in integrating applications. The integrated applications may also use a text description of the pathway and display any information desired to the user.

The ranking value generated by the ranking generating module 320, 420 may be updated automatically based on on-going collection of information by the universal social graph platform 302, 402. In one example, public information is continuously gathered from the Internet 310 and other public information 308, 408, and the ranking generating module 320, 420 at least periodically updates the ranking values based on the updated information collected. The updates to the ranking value and associated pathways created by the pathway generating module 322, 422 may include both public and private information. In one example, additional private information received by the universal social graph platform 302, 402 may prompt updates to the ranking value and pathways created by the ranking system 318, 418.

The ranking systems 318, 418 may operate or be synchronized with other aspects of a universal social graph created by the universal social graph generating module 304, 404. Other example modules and functionality with which the ranking system 318, 418 may operate is disclosed in U.S. patent application Ser. No. 12/907,861 entitled "Systems and Methods for Generating and Managing a Universal Social Graph Database," and filed on Oct. 19, 2010, which is incorporated herein in its entirety by this reference.

Figure 8:
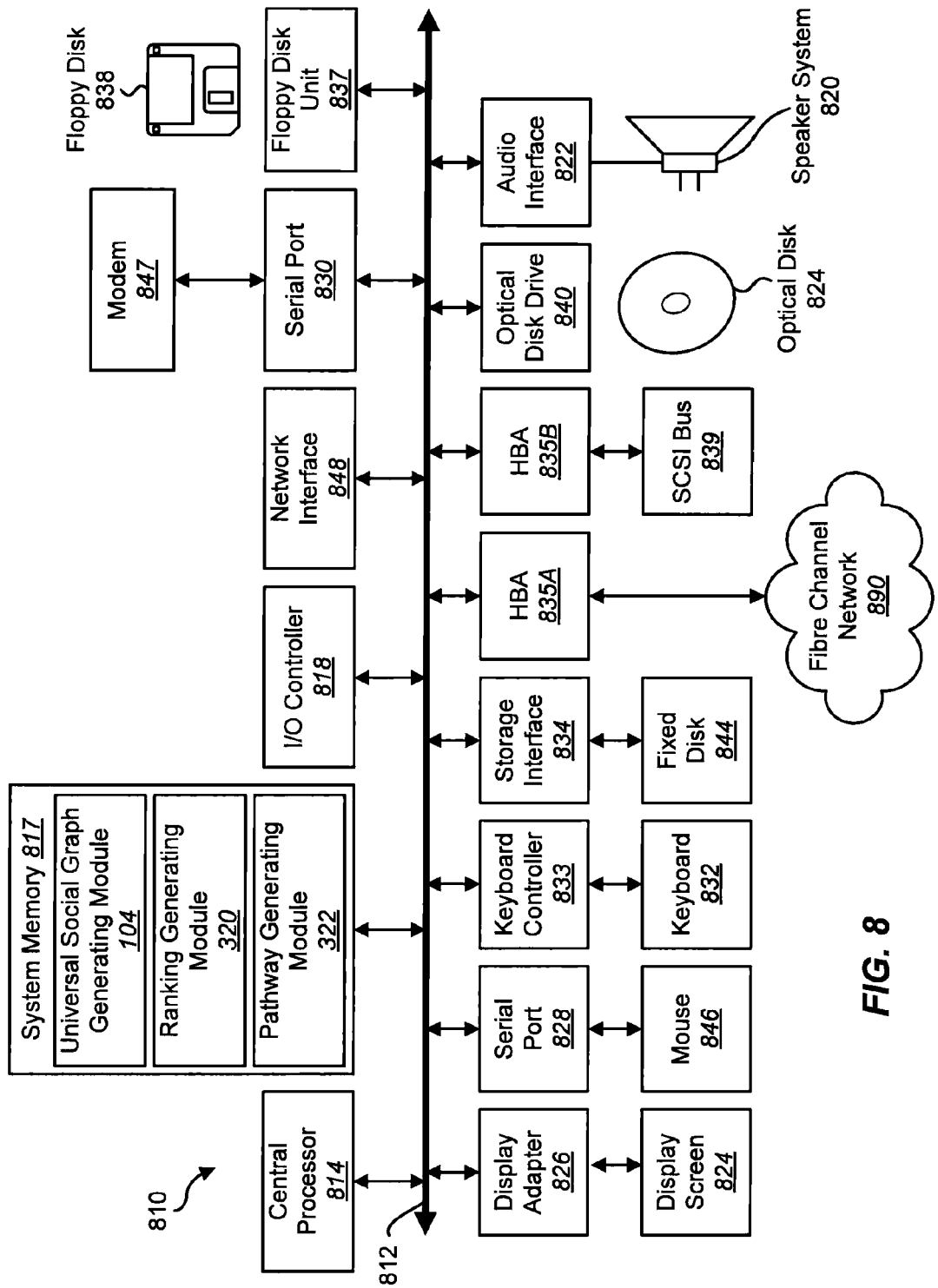
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a universal social graph generating module 104 (or universal social graph generating modules 304, 404), a ranking generating module 320 (or ranking generating module 420), and a pathway generating module 322 (or pathway generating module 422) may be used to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an Internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Figure 9:
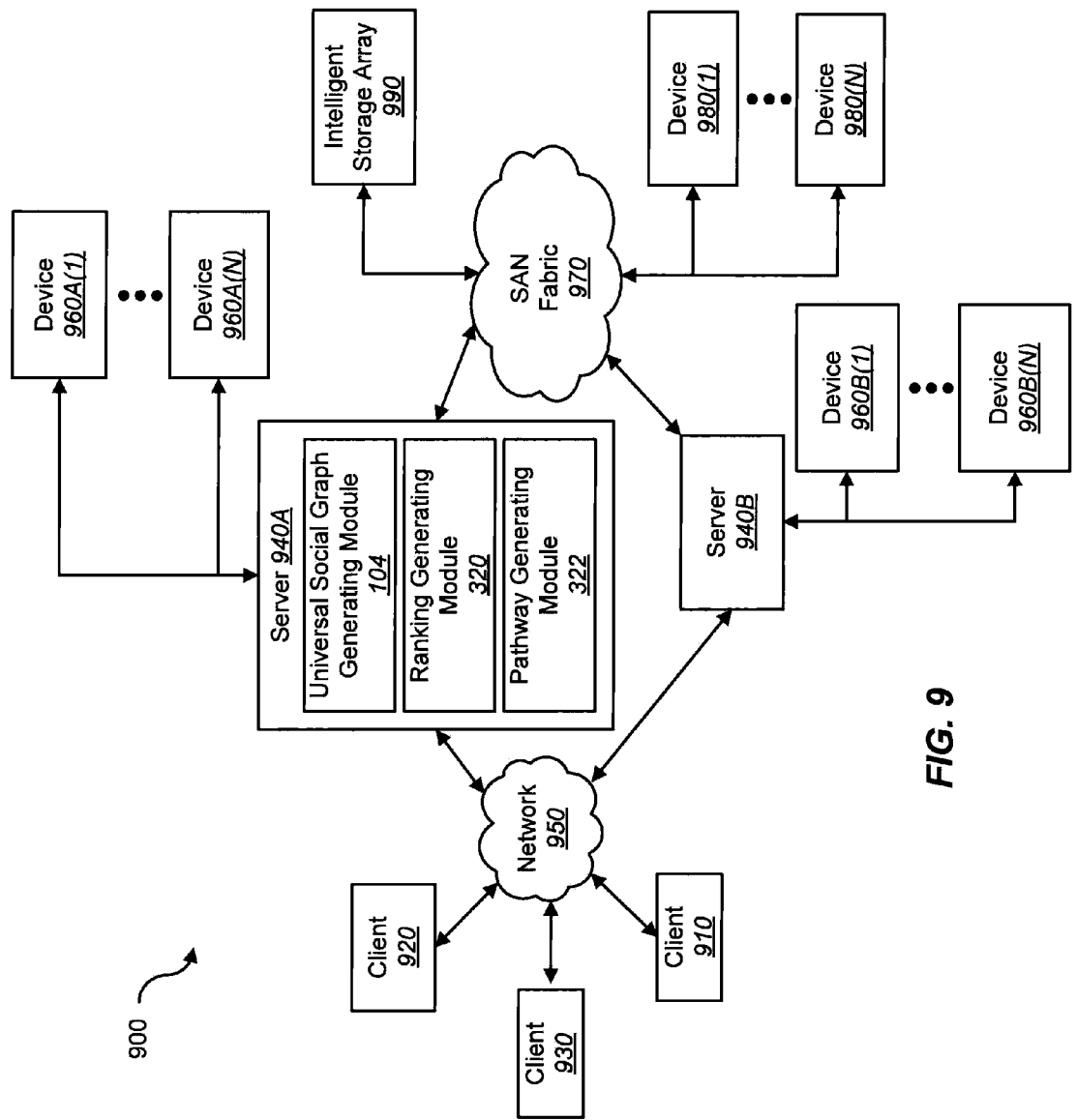
FIG. 9 is a block diagram depicting a network architecture in which client systems, as well as storage servers are coupled to a network.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

FIG. 9 is a block diagram depicting a network architecture 900 in which client systems 910, 920 and 930, as well as storage servers 940A and 940B (any of which can be implemented using computer system 910), are coupled to a network 950. In one embodiment, the universal social graph generating module 104 (or universal social graph generating modules 304, 404), a ranking generating module 320 (or ranking generating module 420), and a pathway generating module 322 (or pathway generating module 422) may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 10 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining a connection ranking value between entities, comprising:
    receiving private information comprising first relationship information between a user and one or more first entities;
    retrieving public information from publicly available sources;
    wherein the public information comprises information associated with one or more second entities;
    matching the public information with the private information;
    generating, based on the private information and the public information, a graph database comprising the one or more first entities, the one or more second entities, and connectivity information associated with the first entities and the second entities;
    establishing at least one search criteria;
    generating a connection ranking value between the user and each of a plurality of third entities in the graph database based on the at least one search criteria, wherein each of the plurality of third entities is one of the first entities or one of the second entities.

2. The method of claim 1, wherein the private information includes relationship information between the user and a plurality of contacts.

3. The method of claim 1, further comprising continuously retrieving the public information and automatically updating the connection ranking value between the user and one or more of the plurality of third entities.

4. The method of claim 1, further comprising creating one or more connection pathways between the user and each of the plurality of third entities based on the at least one search criteria, wherein the connection ranking value between the user and each of the plurality of third entities is based at least in part on one or more of the connection pathways.

5. The method of claim 4, further comprising displaying the one or more connection pathways and the connection ranking values.

6. The method of claim 1, further comprising receiving private information about the user.

7. A computer system configured to determine a connection ranking value between entities, comprising:
    a processor;
    memory in electronic communication with the processor;
    a ranking generating module is configured to:
        receive private information comprising first relationship information between a user and one or more first entities;
        retrieve public information from publicly available sources;
        wherein the public information comprises information associated with one or more second entities;
        match the public information with the private information;
        generate, based on the private information and the public information, a graph database comprising the one or more first entities, the one or more second entities, and connectivity information associated with the first entities and the second entities;
        establish at least one search criteria;
        generate a ranking value between the user and each of a plurality of third entities in the graph database based on the at least one search criteria, wherein each of the plurality of third entities is one of the first entities or one of the second entities.

8. The computer system of claim 7, wherein the ranking generating module is further configured to continuously retrieve the public information and automatically update the ranking values.

9. The computer system of claim 7, wherein the ranking generating module is further configured to create one or more connection pathways between the user and each of the plurality of third entities based on the at least one search criteria, wherein the ranking value between the user and each of the plurality of third entities is based at least in part on one or more of the connection pathways.

10. The computer system of claim 9, wherein each of the ranking values represents aspects of the one or more of the connection pathways.

11. The computer system of claim 7, wherein each of the ranking values is based at least in part on relationship information between the user and at least one of the third entities.

12. A computer-program product for determining connections between entities, the computer-program product comprising a computer-readable medium having instructions thereon, the instructions comprising:
    code programmed to receive private information comprising first relationship information between a user and one or more first entities;
    code programmed to retrieve public information from publicly available sources;
    wherein the public information comprises information associated with one or more second entities;
    code programmed to match the public information with the private information;
    code programmed to generate, based on the private information and the public information, a graph database comprising the one or more first entities, the one or more second entities, and connectivity information associated with the first entities and the second entities;
    code programmed to establish at least one search criteria;
    code programmed to generate a ranking value between the user and each of a plurality of third entities in the graph database based on the at least one search criteria, wherein each of the plurality of third entities is one of the first entities or one of the second entities.

13. The computer-program product of claim 12, wherein the instructions further comprise code programmed to create one or more pathways based on the at least one search criteria, wherein each ranking value is based at least in part on one or more of the pathways.

14. The computer-program product of claim 13, wherein the instructions further comprise displaying one or more of the ranking values and the pathways.

* * * * *